United States Patent
Nakamura et al.

(10) Patent No.: US 10,599,190 B2
(45) Date of Patent: Mar. 24, 2020

(54) IMAGE DISPLAY DEVICE INCLUDING A CAMERA AND BEING ABLE TO PREVENT AN IMAGE PICKUP WINDOW PART FROM REDUCING A DISPLAY AREA

(71) Applicant: SHARP KABUSHIKI KAISHA, Sakai, Osaka (JP)

(72) Inventors: Jin Nakamura, Sakai (JP); Masayuki Ohhashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/232,003

(22) Filed: Dec. 25, 2018

(65) Prior Publication Data

US 2019/0243427 A1 Aug. 8, 2019

(30) Foreign Application Priority Data

Feb. 2, 2018 (JP) ................................ 2018-017483

(51) Int. Cl.
*G06F 1/16* (2006.01)
*H04N 5/225* (2006.01)

(52) U.S. Cl.
CPC ......... *G06F 1/1686* (2013.01); *H04N 5/2253* (2013.01); *H04N 5/2254* (2013.01); *H04N 5/2257* (2013.01)

(58) Field of Classification Search
CPC ............... H04N 5/2253; H04N 5/2254; H04N 5/22541; H04N 5/2257; G06F 1/1686
See application file for complete search history.

(56) References Cited

U.S. PATENT DOCUMENTS

| | | | |
|---|---|---|---|
| 9,806,219 B2 * | 10/2017 | Benson | G06F 1/1643 |
| 10,338,644 B2 * | 7/2019 | Jung | G06F 1/1686 |
| 2008/0117497 A1 | 5/2008 | Shimodaira | |
| 2008/0225216 A1 | 9/2008 | Shimodaira | |
| 2012/0069241 A1 * | 3/2012 | Shiau | G06F 1/1605 |
| | | | 348/373 |
| 2017/0150022 A1 * | 5/2017 | Shigemitsu | G02B 7/04 |

FOREIGN PATENT DOCUMENTS

| | | | |
|---|---|---|---|
| JP | 2008-101352 A | 5/2008 | |
| JP | 2008-257191 A | 10/2008 | |

\* cited by examiner

*Primary Examiner* — Luong T Nguyen
(74) *Attorney, Agent, or Firm* — ScienBiziP, P.C.

(57) ABSTRACT

Provided is an image display device which includes an image pickup camera and makes it possible to prevent an image pickup window part from reducing a display area. The image display device which includes the image pickup camera is configured such that: the image pickup window part for the image pickup camera is disposed in an image display region; and a diameter φp of the image pickup window part is set so as to satisfy a specific condition which is based on an angle of view θ of the image pickup camera.

11 Claims, 4 Drawing Sheets

IMAGE DISPLAY DEVICE INCLUDING A CAMERA AND BEING ABLE TO PREVENT AN IMAGE PICKUP WINDOW PART FROM REDUCING A DISPLAY AREA

This Nonprovisional application claims priority under U.S.C. § 119 on Patent Application No. 2018-017483 filed in Japan on Feb. 2, 2018, the entire contents of which are hereby incorporated by reference.

TECHNICAL FIELD

The present invention relates to an image display device.

BACKGROUND ART

Image display devices such as a liquid crystal display device are used in various fields of, for example, mobile phones or on-vehicle display devices. Known examples of such an image display device include image display devices each including an image pickup camera which is configured to pick up an image and is disposed so as to face toward a display area (also referred to as an "image display region"). These image display devices each (i) have, in a non-display area which surrounds the display area, a window part through which to pick up an image (hereinafter, referred to as an "image pickup window part") and (ii) include the image pickup camera which is disposed so as to correspond to the image pickup window part (see, for example, Patent Literatures 1 and 2).

CITATION LIST

Patent Literatures

[Patent Literature 1]
Japanese Patent Application Publication, Tokukai, No. 2008-101352
[Patent Literature 2]
Japanese Patent Application. Publication, Tokukai, No. 2008-257191

SUMMARY OF INVENTION

Technical Problem

Note, however, that an image display device of such a conventional technique as described earlier unfortunately makes the non-display area wider and makes the display area smaller in accordance with the non-display area thus made wider. This is because the image display device includes the image pickup camera which is disposed in the image pickup window part.

An aspect of the present invention has an object to provide an image display device which includes an image pickup camera and makes it possible to prevent an image pickup window part from reducing a display area.

Solution to Problem

In order to attain the object, an image display device in accordance with an aspect of the present invention includes: an image forming layer for forming an image in an image display region; and an image pickup camera which includes an image pickup lens and is disposed on the back surface side of the image forming layer, at a location in the image display region in a plan view of the image forming layer, so as to face toward a display surface of the image forming layer, the image forming layer having an image pickup window part which is located on an optical path, in the image forming layer, of the image pickup camera so as to overlap the image pickup lens in a plan view of the image forming layer, and the image pickup window part having, at an edge located on the display surface side thereof, a diameter φp which satisfies the following condition:
$2D_p \tan(\theta/2) \leq \varphi p$ where $D_p$ represents a distance between the edge and a camera focal point in a direction in which an optical axis of the image pickup lens extends; and θ represents an angle of view of the image pickup camera.

Advantageous Effects of Invention

An aspect of the present invention makes it possible to provide an image display device which includes an image pickup camera configured to pick up an image and which makes it possible to prevent an image pickup window part from reducing a display area.

Figure 3:
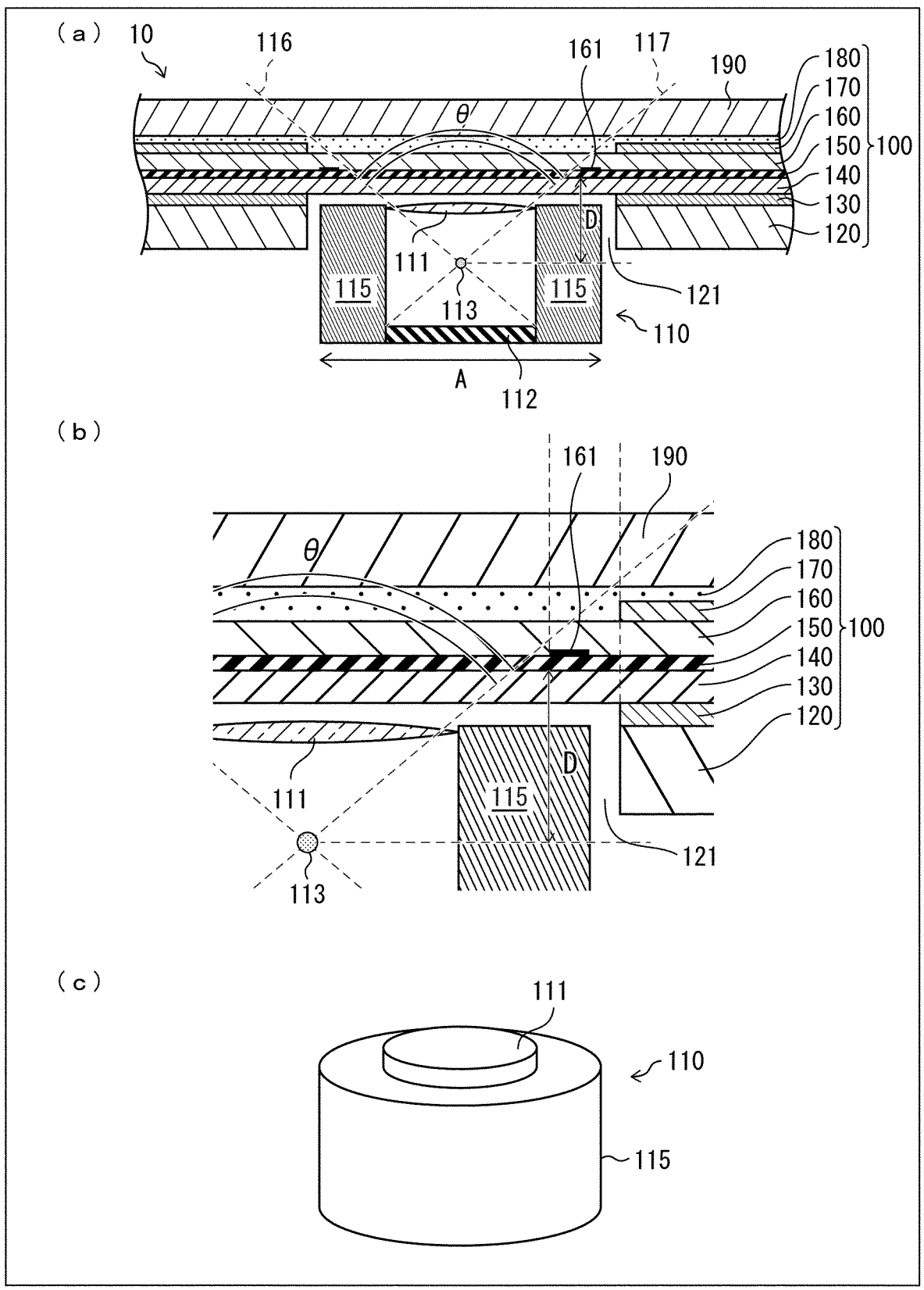

(a) of FIG. 3 is a view schematically illustrating a configuration of a cross section of the image display device in accordance with Embodiment 1 of the present invention (b) of FIG. 3 is an enlarged view of a main part of the cross section of the image display device of (a) of FIG. 3 of FIG. 3 is a view schematically illustrating the shape of an image pickup camera of the image display device.

Figure 4:
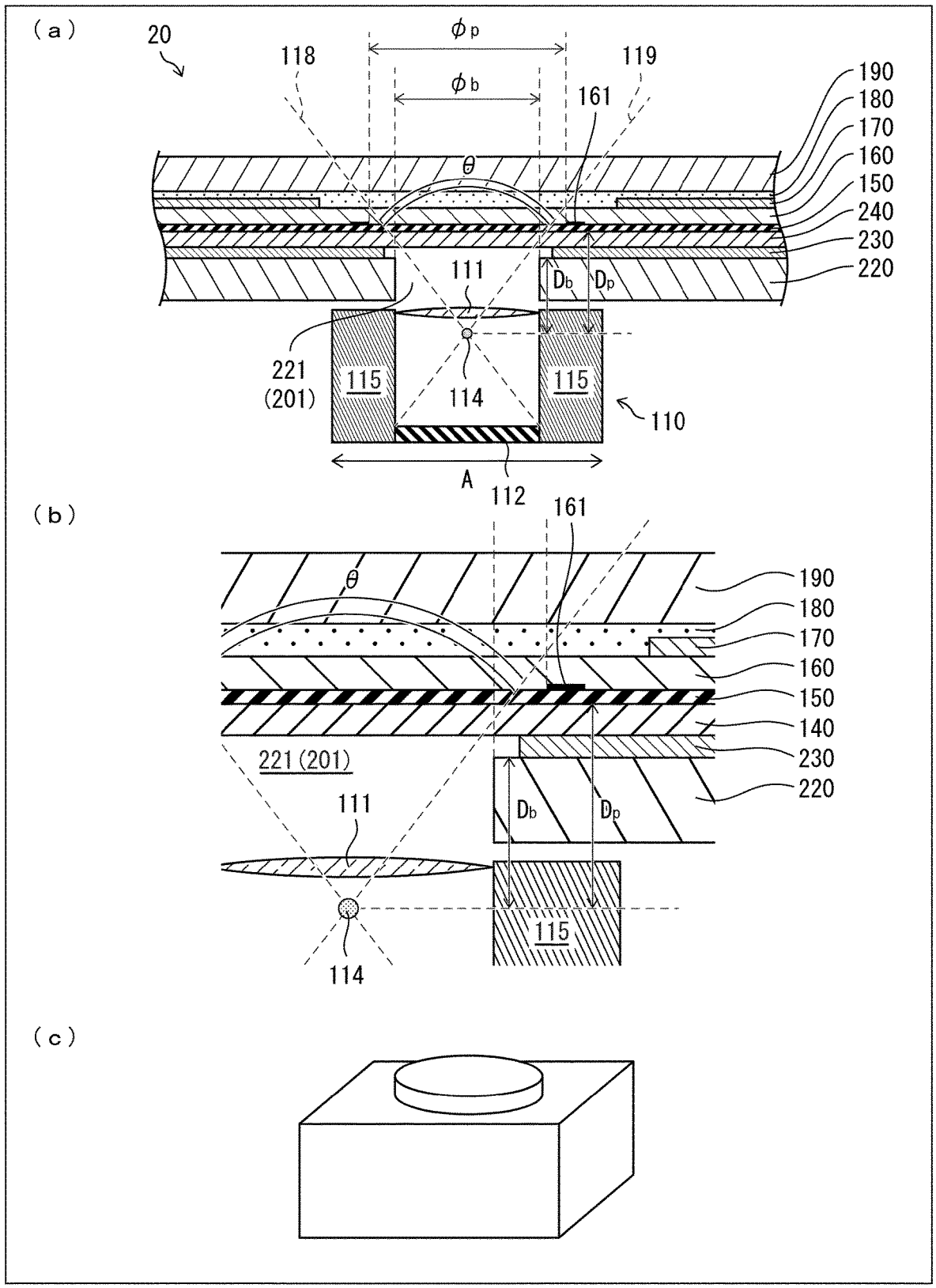

(a) of FIG. 4 is a cross-sectional view schematically illustrating a configuration of a cross section of an image display device in accordance with Embodiment 2 of the present invention. (b) of FIG. 4 is an enlarged view of a main part of the cross section of the image display device of (a) of FIG. 4. (c) of FIG. 4 is a view schematically illustrating the shape of an example of an image pickup camera which is used in Embodiment 2.

DESCRIPTION OF EMBODIMENTS

Embodiment 1

Figure 1:
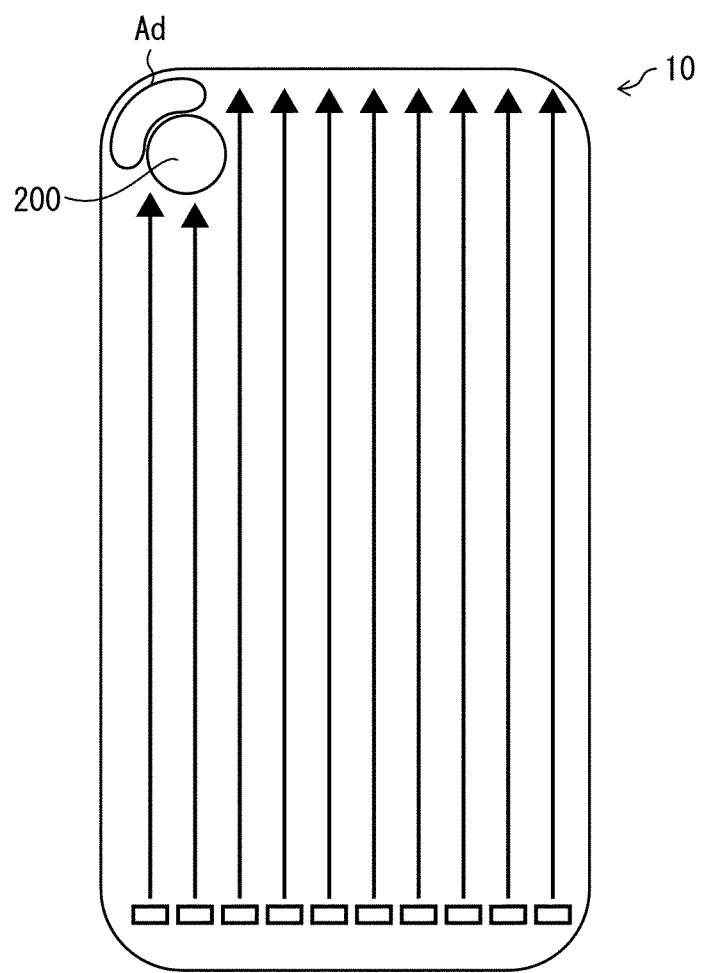
FIG. 1 is a view schematically illustrating a configuration of an image display device in accordance with Embodiment 1 of the present invention.
Figure 2:
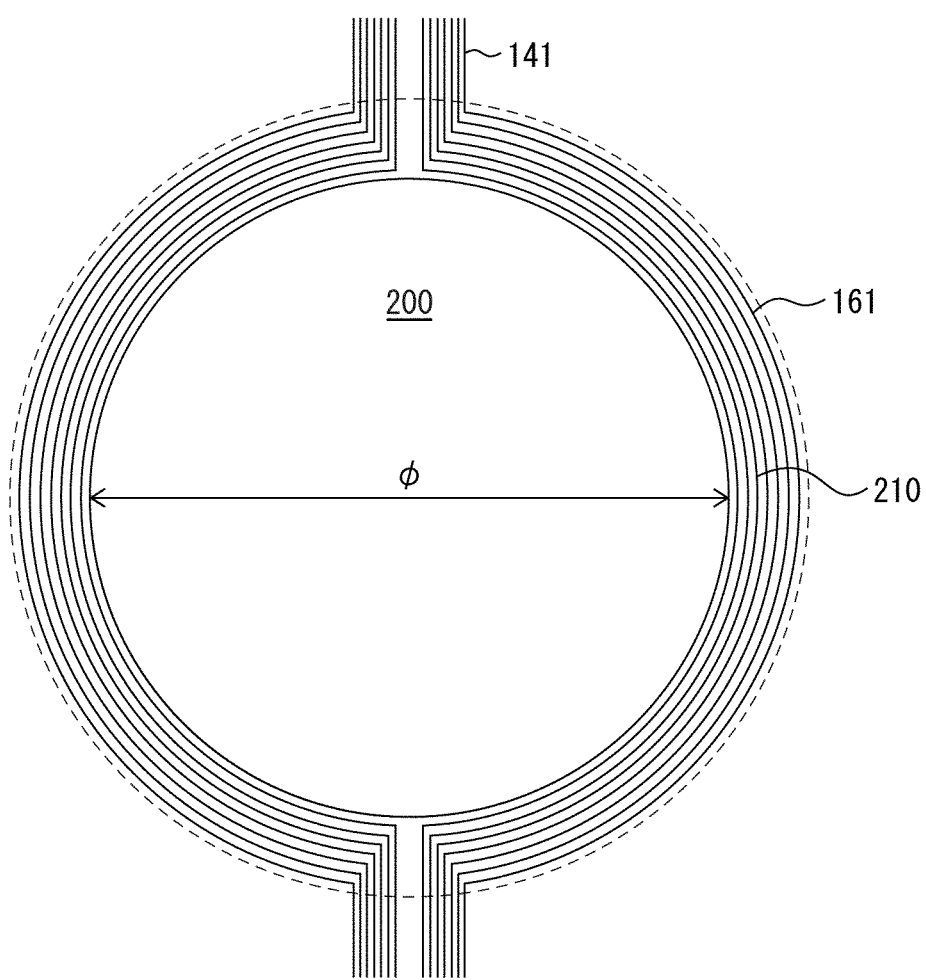
FIG. 2 is a view schematically illustrating wires and a black matrix in accordance with. Embodiment 1 of the present invention.

An embodiment of the present invention is specifically described below. FIG. 1 is a view schematically illustrating a configuration of an image display device in accordance with Embodiment 1 of the present invention. FIG. 2 is a view schematically illustrating wires and a black matrix in accordance with Embodiment 1 of the present invention. (a) of FIG. 3 is a view schematically illustrating a configuration of a cross section of the image display device in accordance with Embodiment 1 of the present invention (b) of FIG. 3 is an enlarged view of a main part of the cross section of the image display device of (a) of FIG. 3. (c) of FIG. 3 is a view schematically illustrating the shape of an image pickup camera of the image display device.

As illustrated in FIG. 1 and (a) and (b) of FIG. 3, an image display device 10 includes a liquid crystal display panel 100 and an image pickup camera 110.

The liquid crystal display panel 100 includes a backlight 120, a first polarizing plate 130, a thin-film transistor (TFT)

substrate 140, a liquid crystal layer 150, a color filter substrate 160, a second polarizing plate 170, an adhesive layer 180, a cover glass 190, and an image pickup window part 200. The liquid crystal display panel 100 falls under an image forming layer for forming an image in an image display region.

The backlight 120 is a light source of the liquid crystal display panel 100. The backlight 120 which is viewed from above has a rectangular shape (planar shape). The backlight 120 has a through hole 121. The through hole 121 is a hole in which to contain the image pickup camera 110, and is disposed inside the image display region of the liquid crystal display panel 100 which is viewed from above. Note that the image display region is a display area which is Suri ounded by a non-display area such as a frame which frames the image display device 10. In the image display region, a desired image is displayed by a liquid crystal. The through hole 121 has a planar shape which can be appropriately determined in accordance with a planar shape of the image pickup camera 110. For example, the through hole 121 has a circular planar shape which is identical to the planar shape of the image pickup camera 110.

The first polarizing plate 130 can be appropriately selected from polarizing plates each of which is publicly known to be usable for an image display device.

The TFT substrate 140 is configured so as to be identical to a TFT substrate which is publicly known to be usable for an image display device. For example, according to the TFT substrate 140, a glass substrate, a scanning signal line, a light-transmissive inorganic insulating film, a semiconductor film (e.g., a semiconductor film made of amorphous silicon, low-temperature polysilicon, or an oxide semiconductor), a data signal line and a drain electrode, a light-transmissive organic insulating film, a light-transmissive sensor signal line, a light-transmissive inorganic insulating film, a light-transmissive pixel electrode, a light-transmissive inorganic insulating film, and a light-transmissive common electrode are disposed in this order in an upward direction (a direction in which display light is emitted). The TFT substrate 140 can also be provided with a transistor in which the semiconductor film serves as a channel. The pixel electrode, the common electrode, and the sensor signal line each can be made of a light-transmissive metallic compound such as ITO or IZO.

The liquid crystal layer 150 can be appropriately selected from liquid crystal layers each of which is publicly known to be usable for an image display device.

As in the case of the TFT substrate 140, the color filter substrate 160 is configured so as to be identical to a color filter substrate which is publicly known to be usable for an image display device. For example, the color filter substrate includes color filters of primary colors (red, green, and blue), a colorless coat (transparent coat), and a black matrix. The colorless coat desirably has a light transmittance of not less than 90% and can be a color material for a white subpixel.

As in the case of the first polarizing plate 130, the second polarizing plate 170 can be appropriately selected from polarizing plates each of which is publicly known to be usable for an image display device. A direction in which light is polarized by each of the first polarizing plate 130 and the second polarizing plate 170 is appropriately determined in accordance with a liquid crystal structure of a liquid crystal display panel.

The adhesive layer (OCR) 180 is a light-transmissive adhesive layer and adheres the second polarizing plate 170 to the cover glass 190.

The image pickup window part 200 is a part of the liquid crystal display panel 100 which part is opposite to the through hole 121. The image pickup window part 200 is an optical path for an image pickup carried out by the image pickup camera 110, and is sufficiently transparent enough for the image pickup camera 110 to pick up an image. Respective parts of the first polarizing plate 130 and the second polarizing plate 170 each of which parts corresponds to the image pickup window part 200 are each a through hole.

A part of the TFT substrate 140 which part corresponds to the image pickup window part 200 is a region of the TFT substrate 140, the region being made of a transparent substrate and having substantially no wires 141. More specifically, as illustrated in FIG. 2, the part of the TFT substrate 140 is made up of the image pickup window part 200 which has a circular planar shape and a frame part 210 which is ring-shaped and frames the image pickup window part 200. The frame part 210 is disposed on the TFT substrate 140, and includes the wires 141 which are disposed so as to circle the image pickup window part 200 and a black matrix 161 which is disposed so as to overlap the wires 141 when viewed from above. For example, the wires 141 are disposed along an edge of the image pickup window part 200. The black matrix 161 is located above the wires 141.

The image pickup camera 110 is disposed inside the through hole 121 as illustrated in (a) of FIG. 3. The image pickup camera 110 is thus disposed on the back surface side of the image forming layer, at a location in the image display region in a plan view of the liquid crystal display panel 100, so as to face toward a display surface of the liquid crystal display panel 100.

As illustrated in of FIG. 3, the image pickup camera 110 includes a tubular part 115, a sensor 112 which is disposed at one end of the tubular part 115, and an image pickup lens 111 which is disposed at the other end of the tubular part 115. The image pickup camera 110 is, for example, an image pickup device such as a CCD image sensor or a CMOS image sensor.

According to the image display device 10, the image pickup window part 200 has a diameter φp which satisfies the following condition:

$2D_p \tan(\theta/2) \leq \varphi p$ where $D_p$ represents a distance from (a) a camera focal point 113 in a direction in which an optical axis of the image pickup lens 111 extends to (b) an edge located on the display surface side of the image pickup window part 200; and θ represents an angle of view of the image pickup camera 110.

According to the image display device 10, the image pickup window part 200 only needs to have the diameter φp which is large enough for the image pickup window part 200 to function as an image pickup window part. An upper limit of the diameter φp of the image pickup window part 200 can be appropriately determined from the viewpoint of "for an image pickup." From the viewpoint of such a purpose of use, the upper limit can be determined inn a form of a value that can fully prevent the image pickup window part 200 from reducing the display area. Assuming that the image pickup camera 110 which is viewed from above has a length of A, the image pickup window part 200 preferably has the diameter φp whose upper limit is smaller than A. This is because the image pickup window part 200 can have the diameter φp which is the smallest diameter that is in accordance with the angle of view θ of the image pickup camera 110.

Note here that the "camera focal point 113" is a point which is located so that the camera focal point 113 and the sensor 112 have therebetween a distance which is shorter than a focal length of the image pickup camera 110 and that the point is indicated by an intersection of straight lines (hereinafter, one and the other of these straight lines are also referred to as an "upper line" and a "lower line," respectively) 116 and 117 which connect one end and the other end of a detection region of the sensor 112 to the other end and one end, respectively, of a region of the image pickup lens 111 which substantially affects the sensor 112. An angle formed at the intersection of the straight lines each of which extends toward the image pickup lens 111 is an angle of view. According to Embodiment 1, the angle of view is, for example, 90°. The location and the angle of view of the camera focal point 113 can be appropriately adjusted by making the focal length longer or shorter, or by increasing or reducing the detection region of the sensor 112.

According to the image display device 10, the image pickup window part 200 has the diameter φp which satisfies the above expression. The image pickup window part 200 can have the diameter φp which is designed to be the smallest diameter that is in accordance with (i) the angle of view which angle is satisfied by the image pickup camera 110 and (ii) the camera focal point 113. The smallest diameter is represented by a horizontal distance between the upper line 116 and the lower line 117 which distance is obtained when the upper line 116 and the lower line 117 come into contact with the image pickup window part 200 at one point. This allows the image pickup window part 200 to have the diameter φp which is smaller than a width of a plane of the image pickup camera 110 which is viewed from above. Note that the frame part 210 has a size which depends on the number of wires 141 which circle the image pickup window part 200. Thus, the image pickup window part 200 which has a smaller diameter φp causes fewer wires 141 to circle the image pickup window part 200. The configuration makes the frame part 210 smaller as compared with a case where the frame part 210 is disposed around the image pickup camera 110 which is viewed from above. Thus, the configuration makes it possible to achieve a larger image display region as compared with the above case.

The through hole 121 has a circular planar shape which is identical to the planar shape of the image pickup camera 110. In the case of a backlight which has a light source in one side part thereof, it is less easy for light to reach a part of the image display region which part is opposite the light source across the image pickup window part 200 (a part indicated by a reference sign Ad in FIG. 1) However, according to the image display device 10, the image pickup window part 200 is small. Thus, the configuration makes it possible to achieve a more favorable image display as compared with the above case.

The backlight 120 has the through hole 121 in which to contain the image pickup camera 110. The image pickup camera 110 is disposed inside the through hole 121. With the configuration, as compared with a case where the image pickup camera 110 is disposed on a back surface of the backlight 120, the image display device 10 can have a thickness which is made thinner by a thickness by which the image pickup camera 110 is contained in the through hole 121.

The image pickup window part 200 can have an actual diameter which is φp that is found by the above expression. Note, however, that the actual diameter can be larger than φp provided that the actual diameter brings about an effect of Embodiment 1, i.e., provided that the actual diameter of the image pickup window part 200 is smaller than the length, in the planar shape, of the image pickup camera 110. For example, the image pickup window part 200 can have the actual diameter which is obtained by causing φp to further include an assembly margin e.g., 50 μm to 150 μm). Alternatively, the left-hand side of the above expression (2Dp tan(θ/2)) can include a proper coefficient (e.g., 0.5 to 1.5) which corresponds to the assembly margin.

Embodiment 2

Another embodiment of the present invention is described below. (a) of FIG. 4 is a cross-sectional view schematically illustrating a configuration of a cross section of an image display device in accordance with Embodiment 2 of the present invention. (b) of FIG. 4 is an enlarged view of a main part of the cross section of the image display device of (a) of FIG. 4. (c) of FIG. 4 is a view schematically illustrating the shape of an example of an image pickup camera which is used in Embodiment 2. Note that, for convenience, members having functions identical to those of the respective members described in Embodiment 1 are given respective identical reference signs, and a description of those members is not repeated here.

An image display device 20 includes a backlight 220 which is provided instead of the backlight 120 and has a through hole 221, a first polarizing plate 230 which is provided instead of the first polarizing plate 130, a TFT substrate 240 which is provided instead of the TFT substrate 140, and an image pickup window part 201 which is provided instead of the image pickup window part 200. The image display device 20 includes an image pickup camera 110 which is disposed on a back surface of the backlight 220. Except for the above, the image display device 20 is configured as in the case of the image display device 10.

According to the image display device 20, the through hole 221 of the backlight 220 has a diameter φb which satisfies the following condition:

2Db tan(θ/2)≤φb where Db represents a distance from (a) a camera focal point 114 in a direction in which an optical axis of an image pickup lens 111 extends to (b) an edge located on the display surface side of the through hole 221 of the backlight 220.

According to the image display device 20, the through hole 221 of the backlight 220 only needs to have the diameter φb which is large enough for the image pickup window part 201 to function as an image pickup window part. According to the image display device 20, as described in Embodiment 1, an upper limit of the diameter φb of the through hole 221 of the backlight 220 only needs to be a value that can prevent the image pickup window part 201 from reducing a display area. The upper limit is preferably smaller than A.

The camera focal point 114 is indicated by an intersection of an upper line 118 and a lower line 119. According to Embodiment 2, an angle of view is, for example, 80°, which is smaller than the angle of view of Embodiment 1.

The image pickup window part 201 is a part which at least includes a part of a liquid crystal display panel 100 which part is opposite to the through hole 221.

A part of the TFT substrate 240 which part corresponds to the image pickup window part 201 is configured as in the case of the corresponding part of Embodiment 1 (i.e., the part of the TFT substrate 140 which part corresponds to the image pickup window part 200), and the part of the TFT substrate 240 is a region of the TFT substrate 240, the region having no wires 141. A frame part of the TFT substrate 240 is disposed on the TFT substrate 240, and includes wires 141 which are disposed so as to circle the image pickup window part 201 and a black matrix 161 which is disposed so as to overlap the wires 141 when viewed from above (see FIG. 2).

The first polarizing plate 230 has a through hole in a part thereof which corresponds to the image pickup window part 201. The second polarizing plate 170 also has, as in the case of the second polarizing plate 170 of Embodiment 1, a through hole in a part thereof which corresponds to the image pickup window part 201. Diameters of the respective through holes of the first polarizing plate 230 and the second polarizing plate 170 and a diameter of the region of the TFT substrate 240, the region having no wires are each any length that is substantially larger than a horizontal distance between the upper line 118 and the lower line 119 in each of the through holes and the region.

As in the case of the image display device 10, the image display device 20 allows the through hole 221 to have the diameter φb which is smaller than a width of a plane of the image pickup camera 110 which is viewed from above.

Furthermore, the image pickup camera 110 of the image display device 20 is disposed so as to be further away, in the direction in which the optical axis of the image pickup camera 110 extends, from the through holes and the region, each of which can serve as an image pickup window part (so as to be closer to a back surface of the liquid crystal display panel (e.g., so as to be disposed on the back surface of the backlight 220)). This allows the image pickup camera 110 of the image display device 20 to have a smaller angle of view than the image pickup camera 110 of the image display device 10. This allows the image display device 20 to have a much smaller frame part than the image display device 10 of Embodiment 1. Thus, Embodiment 2 allows a larger image display region than Embodiment 1.

Furthermore, the image display device 20 includes the image pickup camera 110 which is disposed on the back surface of the backlight 220. Thus, according to the image display device 20, for example, the camera which has a rectangular planar shape as illustrated in (c) of FIG. 4 can also be provided in the liquid crystal display panel 100 irrespective of the shape of the camera. Furthermore according to the image display device 20, the through hole 221 can have a circular planar shape which is identical to the planar shape of the image pickup lens 111 of the image pickup camera 110, irrespective of the planar shape of the image pickup camera 110. In the case of a backlight which has a light source in one side part thereof, as in the case of the image display device 10, according to the image display device 20, it is also less easy for light to reach a part of an image display region which part is opposite the light source across the image pickup window part 201 (the part indicated by the reference sign. Ad in FIG. 1). Note, however, that the image display device 20, which includes the image pickup window part 201 which is smaller than the image pickup window part 200 of the image display device 10, makes it possible to achieve a more favorable image display as compared with the image display device 10.

[Variation]

Note that the image display devices in accordance with Embodiments 1 and 2 each can further have a configuration (s) different from the configurations (described earlier) or other configuration(s) instead of the configurations (described earlier), provided that the above-described effects of those embodiments can be achieved.

For example, the image forming layer only needs to be a common display panel which allows color to be represented by combining color elements including primary colors (red, green, and blue), or color elements including the primary colors and complementary color elements thereof. The image forming layer can be such a liquid crystal display panel as described earlier in each of Embodiments 1 and 2. The image forming layer can alternatively be an organic EL display panel.

Furthermore, according to Embodiment 2, not only the diameter of the through hole of the backlight but also each of the diameters of the through holes and the region on an optical path of the image pickup camera, such as diameters at respective edges of the first polarizing plate, the second polarizing plate, the black matrix of a color filter substrate, and the black matrix of a cover glass can be designed to satisfy the above expression. According to the image display device 20, art upper limit of each of the diameters of the through holes and the region on the optical path of the image pickup camera, such as the diameters at the respective edges of the first polarizing plate, the second polarizing plate, the black matrix of the color filter substrate, and the black matrix of the cover glass only needs to be a value that can prevent the image pickup window part 201 from reducing the display area. The upper limit is preferably smaller than A. With the configuration, in a case where a frame part which frames each of the through holes or the region is provided, the frame part can be designed with higher accuracy. Thus, the configuration is more effective because the configuration allows a non-display area including the image pickup window part and the frame part to be minimized, and consequently allows the image display region to be enlarged so as to be maximized.

[Recap]

An image display device 10 in accordance with a first aspect of the present invention includes: a liquid crystal display panel (image forming layer) 100 for forming an image in an image display region; and an image pickup camera 110 which includes an image pickup lens 111 and is disposed on the back surface side of the liquid crystal display panel 100, at a location in the image display region in a plan view of the liquid crystal display panel 100, so as to face toward a display surface of the liquid crystal display panel 100, the liquid crystal display panel 100 having an image pickup window part 200 which is located on an optical path, in the liquid crystal display panel 100, of the image pickup camera 110 so as to overlap the image pickup lens 111 in a plan view of the liquid crystal display panel 100, and the image pickup window part having, at an edge located on the display surface side thereof, a diameter φp which satisfies the following condition:

$2Dp \tan(\theta/2) \leq \varphi p$ where Dp represents a distance between the edge and a camera focal point in a direction in which an optical axis of the image pickup lens extends; and θ represents an angle of view of the image pickup camera. The configuration allows the image pickup window part 200 to have the diameter φp which is smaller than a width of a plane of the image pickup camera 110 which is viewed from above. Thus, as compared with a conventional image display device which has an image pickup window part in a non-display area which surrounds a display area, the image display device 10 which includes the image pickup camera 110 makes it possible to further prevent the image pickup window part 200 from reducing a display area.

An image display device 10 in accordance with a second aspect of the present invention can be configured, in the first aspect, to further include a frame part 210 which frames the image pickup window part 200.

The configuration is more effective because the configuration (i) prevents or reduces an influence of light which enters the image pickup window part 200 from the liquid crystal display panel 100 and (ii) allows the image pickup camera 110 to pick up an image having a high quality.

An image display device 10 in accordance with a third aspect of the present invention can be configured such that: in the first or second aspect, the liquid crystal display panel 100 includes (i) a backlight 120 having a through hole 121 and a thin-film transistor substrate 140; the image pickup camera 110 is disposed in the through hole 121; and the image pickup window part 200 includes a region of the thin-film transistor substrate 140, the region having no wires 141.

With the configuration, as compared with a case where the image pickup camera 110 is disposed on a back surface of the backlight 120, the image display device 10 can have a thickness which is made thinner by a thickness by which the image pickup camera 110 is contained in the through hole 121.

An image display device 20 in accordance with a fourth aspect of the present invention can be configured such that: in the first or second aspect, the liquid crystal display panel 100 includes (i) a backlight 220 having a through hole 221 and (ii) a thin-film transistor substrate 240; the image pickup camera 110 is disposed on a back surface of the backlight 220; and the image pickup window part 201 includes the through hole 221 and a region of the thin-film transistor substrate 240, the region having no wires.

With the configuration, the image display device 20 which includes the image pickup camera 110 makes it possible to prevent the image pickup window part 201 from reducing a display area.

An image display device 10 in accordance with a fifth aspect of the present invention can be configured such that, in the third or fourth aspect, the frame part 210 is disposed on the TFT substrate 140, and includes wires 141 which are disposed so as to circle the image pickup window part 200 and a black matrix 161 which is disposed so as to overlap the wires 141 when viewed from above.

The configuration is more effective for a reason similar to the reason for which the configuration of the second aspect is more effective.

An image display device in accordance with a sixth aspect of the present invention can be configured such that, in any of the first through fifth aspects, the image forming layer is a liquid crystal display panel as described earlier.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 10, 20 Image display device
100 Liquid crystal display panel
110 Image pickup camera
111 Image pickup lens
112 Sensor
113, 114 Camera focal point
115 Tubular part
116, 118 Upper line
117, 119 Lower line
120, 220 Backlight
121, 221 Through hole
130, 230 First polarizing plate
140, 240 Thin-film transistor (TFT) substrate
141 Wire
150 Liquid crystal layer
160 Color filter substrate
161 Black matrix
170 Second polarizing plate
180 Adhesive layer
190 Cover glass
200, 201 Image pickup window part
210 Frame part
Ad Part opposite light source

The invention claimed is:

1. An image display device comprising:
an image forming layer for forming an image in an image display region; and
an image pickup camera which includes an image pickup lens and is disposed on a back surface side of the image forming layer, at a location in the image display region in a plan view of the image forming layer, so as to face toward a display surface side of the image forming layer,
the image forming layer having an image pickup window part which is located on an optical path, in the image forming layer, of the image pickup camera so as to overlap the image pickup lens in a plan view of the image forming layer, and
the image pickup window part having, at an edge located on the display surface side thereof, a diameter φp which satisfies the following condition:

$$2Dp \tan(\theta/2) \le \varphi p$$

where Dp represents a distance between the edge and a camera focal point in a direction in which an optical axis of the image pickup lens extends; and θ represents an angle of view of the image pickup camera.

2. The image display device as set forth in claim 1, further comprising a frame part which frames the image pickup window part.

3. The image display device as set forth in claim 1, wherein:
the image forming layer includes (i) a backlight having a through hole and (ii) a thin-film transistor substrate;
the image pickup camera is disposed in the through hole; and
the image pickup window part includes a region of the thin-film transistor substrate, the region having no wires.

4. The image display device as set forth in claim 2, wherein:
the image forming layer includes (i) a backlight having a through hole and (ii) a thin-film transistor substrate;
the image pickup camera is disposed in the through hole; and
the image pickup window part includes a region of the thin-film transistor substrate, the region having no wires.

5. The image display device as set forth in claim 1, wherein:
the image forming layer includes (i) a backlight having a through hole and (ii) a thin-film transistor substrate;
the image pickup camera is disposed on a back surface of the backlight; and
the image pickup window part includes the through hole and a region of the thin-film transistor substrate, the region having no wires.

6. The image display device as set forth in claim 2, wherein:
- the image forming layer includes (i) a backlight having a through hole and (ii) a thin-film transistor substrate;
- the image pickup camera is disposed on a back surface of the backlight; and
- the image pickup window part includes the through hole and a region of the thin-film transistor substrate, the through region having no wires.

7. The image display device as set forth in claim 3, wherein a frame part is disposed on the thin-film transistor substrate, and includes wires which are disposed so as to circle the image pickup window part and a black matrix which is disposed so as to overlap the wires when viewed from above.

8. The image display device as set forth in claim 4, wherein the frame part is disposed on the thin-film transistor substrate, and includes wires which are disposed so as to circle the image pickup window part and a black matrix which is disposed so as to overlap the wires when viewed from above.

9. The image display device as set forth in claim 5, wherein a frame part is disposed on the thin-film transistor substrate, and includes wires which are disposed so as to circle the image pickup window part and a black matrix which is disposed so as to overlap the wires when viewed from above.

10. The image display device as set forth in claim 6, wherein the frame part is disposed on the thin-film transistor substrate, and includes wires which are disposed so as to circle the image pickup window part and a black matrix which is disposed so as to overlap the wires when viewed from above.

11. The image display device as set forth in claim 1, wherein the image forming layer is a liquid crystal display panel.

* * * * *